T. WANG.
SPRAYER.
APPLICATION FILED AUG. 15, 1913.

1,109,883.

Patented Sept. 8, 1914.

Witnesses
Frank Hough
J. W. Garner

Inventor
Theodore Wang,
By Victor J. Evans
Attorney

UNITED STATES PATENT OFFICE.

THEODORE WANG, OF JACKSONVILLE, FLORIDA.

SPRAYER.

1,109,883.  Specification of Letters Patent.  Patented Sept. 8, 1914.

Application filed August 15, 1913. Serial No. 784,939.

*To all whom it may concern:*

Be it known that I, THEODORE WANG, a citizen of the United States, residing at Jacksonville, in the county of Duval and State of Florida, have invented new and useful Improvements in Sprayers, of which the following is a specification.

This invention is an improved sprayer adapted for use in connection with a hose for sprinkling lawns and other like uses and embodying essentially a support for connection with a hose and having an intake duct, a rotor carried by the support and against which the intake duct discharges and a discharge tube extending from and revolved by the rotor, the invention further consisting in the construction, combination and arrangement of devices hereinafter described and claimed.

One object of my invention is to provide an improved sprayer which is extremely cheap and simple, is strong and durable and the parts of which may be readily assembled and disassembled.

Another object is to effect improvements in the construction of the casing of the rotor whereby a member of the casing is also utilized as a cone for the reception of bearing balls which minimize friction in the bearing of the rotor.

Figure 1:
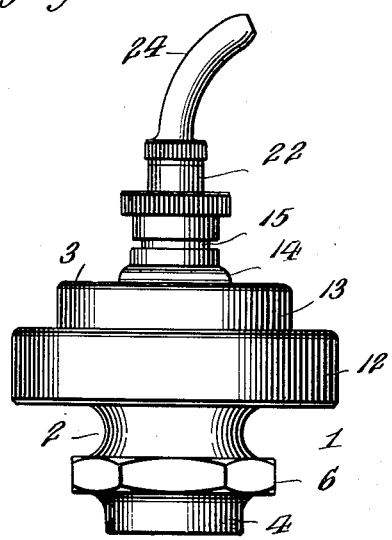
Figure 2:
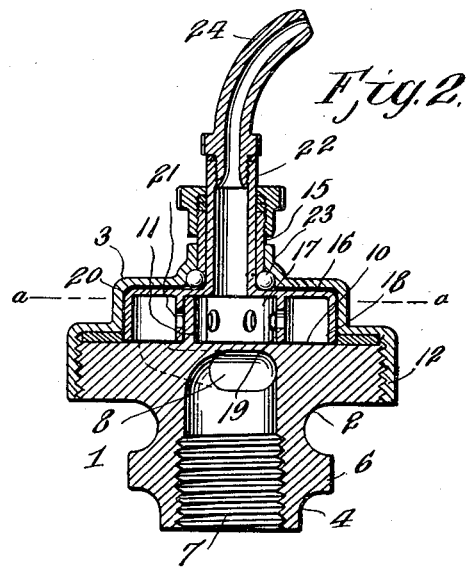
Figure 4:
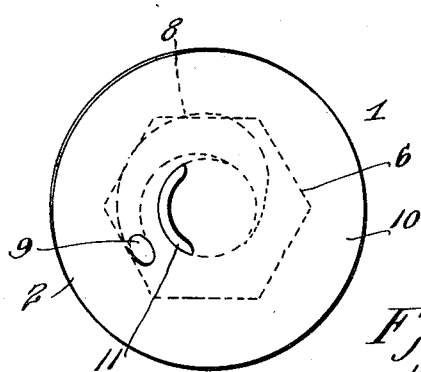
Figure 3:
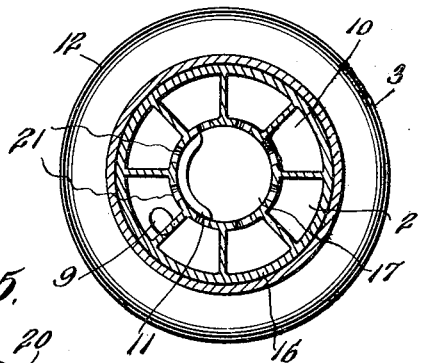
Figure 5:
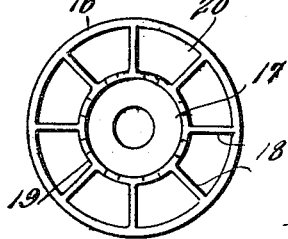

In the accompanying drawing:—Figure 1 is an elevation of a sprayer constructed in accordance with my invention, with a portion of the cover of the casing removed. Fig. 2 is a vertical central sectional view of the same. Fig. 3 is a transverse sectional view of the same on the plane indicated by the line *a—a* of Fig. 2. Fig. 4 is a detail plan of the body or lower portion of the casing or support. Fig. 5 is an inverted plan of the rotor.

In accordance with my invention, I provide a suitable support which is here indicated at 1 and specifically consists of a body or main member 2 and a cover 3. The body 2 is circular, is provided with screw threads and on its under side has a centrally arranged shank 4 which is formed with a polygonal flange 6 adapted to be engaged by the hand or by a wrench when attaching the body to a hose or removing the same therefrom.

The shank of the body is provided with a centrally located threaded opening 7 adapted to be screwed to a coupling member at one end of a hose and from the said opening 7 extends an intake duct 8 which is arranged spirally, diminishes diametrically toward its discharge end, and the discharge end 9 of the duct is at the plane face 10 of the body and at a point a suitable distance from the center thereof. The number of these intake ducts is optional, one being here shown. The body 1 of the support or casing is also provided with a segmental baffle 11 which projects from the plane face 10 of the body and is arranged with one end between the discharge end of the duct and the center of the body, as shown in Fig. 4. The number of these baffles is also optional and should correspond with that of the intake ducts.

The cover 3 of the casing has a portion 12 which is internally threaded and is adapted to be engaged with the threaded portion of the body so that the cover may be readily attached to and detached from the body and may be also adjusted thereon. The cover is also formed with a circular chamber 13 and with a central conical portion 14, the latter forming a collar to which the inner end of a bearing sleeve 15 is attached, preferably by soldering.

The body 1 may be a casting, the cover 3 is preferably made of pressed brass or other similar material and the bearing sleeve 15 is preferably a short portion of a brass tube. Hence, the body or casing of my improved sprayer may be very readily and cheaply manufactured. A rotor 16 is arranged for revolution in the chamber 13 of the cover of the casing and on the face 10 of the body of the casing. This rotor is here shown as provided on its under side, or that side which is opposed to the face 10 in the body of the casing with a centrally located chamber 17 and with a series of radial and obliquely arranged blades 18 which project from the circular wall 19 of said chamber. The upper side of the rotor is closed as at 20, the spaces between the blades 18 form peripherally arranged buckets and openings 21 are made through the wall 19 and which establish communication between the central chamber 17 and the buckets or spaces between the blades of the rotor. The diameter of the chamber 17 is such that the segmental baffle 11 of the body of the casing is arranged just within and in close proximity to the wall 19 and it will be observed that the baffle serves to cut off one or more of the openings 21 in succession as the rotor revolves and, moreover, that the openings 21 permit the passage of water from the buckets of the rotor inwardly to the chamber 17 thereof, the water then passing from the rotor out through the bore of a tubular shaft 22 with which the rotor is provided.

The buckets of the rotor in succession pass over the discharge opening 9 of the intake duct of the body of the casing and, hence, the said intake duct discharges against the blades of the rotor and the latter is caused to revolve. The tubular shaft 22 of the rotor is arranged in and projects through the bore of the bearing sleeve 15. A suitable number of bearing balls 23 are arranged in the cone 14 of the cover and bear on the rotor in the angle between the outer side thereof and the inner end of the tubular shaft. These bearing balls in connection with the cone form a ball bearing for the rotor so as to minimize friction and promote the rapid revolution of the rotor and it will be understood that the cover 3 of the casing may be adjusted on the body 1 to take up wear at any time between the bearing balls, or against the rotor, should the same become necessary, and also to prevent binding on the bearing balls.

To the outer end of the tubular shaft 22 of the rotor is attached a discharge tube or nozzle 24 which is curved longitudinally so that its discharge end is eccentric to the rotor and, hence, as the rotor revolves and the water passes therethrough and out through the discharge nozzle it is effectually sprayed by the rotation of the nozzle and discharged as it is sprayed on the grass, flower bed, or according to the use to which the sprayer is applied.

It is obvious that the sprayer may also be used for applying disinfectants to trees and plants and for washing carriages, windows and other analogous uses and I would have it understood that I am not limited in this particular.

While I have herein shown and described a preferred form of the invention, I would have it understood that changes may be made in the form, proportion and construction of the several parts without departing from the spirit of the invention and within the scope of the appended claims.

I claim:—

1. A sprayer comprising a casing having a chamber and an intake duct at an angle to and extending through one face of the chamber at a point spaced from the center and also having a baffle projecting into the chamber from said face and between the center of said chamber and the inner or discharge end of the intake duct, a rotor in the chamber of the casing, having a central chamber at one side of and in which the baffle is located, and also having openings in the wall of its chamber and buckets on the outer side of said wall and with which said openings communicate, said buckets being arranged to pass over the inner end of said intake duct, and a discharge tube extending from and revolved by the rotor and arranged with its inner end communicating with the chamber of the rotor and its outer end eccentric thereto.

2. A sprayer comprising a casing including a body and a cover detachably secured on the body, the body being provided with an intake duct, the discharge end of which is eccentric thereto and also with a baffle between its center and the discharge end of the intake duct, the said cover forming a chamber in connection with that face of the body through which the duct discharges and being also provided with a centrally arranged bearing, and a rotor arranged in the said chamber of the casing, having a centrally arranged tubular shaft extending through the bearing, said rotor being provided with a central chamber at one side of and in which the baffle is located, and also having openings in the wall of said chamber and buckets on the outer side of said wall and with which said openings communicate, the buckets being arranged to pass over the inner end of the intake duct and a discharge tube extending from and revolved by the tubular shaft of the rotor and arranged with its outer end eccentric to the rotor.

3. A sprayer comprising a casing including a body and a cover detachably secured on the body, the body being provided with an intake duct, the discharge end of which is eccentric thereto and also with a baffle between its center and the discharge end of the intake duct, the said cover forming a chamber in connection with that face of the body through which the duct discharges and being also provided with a centrally arranged bearing, and a rotor arranged in the said chamber of the casing, having a centrally arranged tubular shaft extending through the bearing, said rotor being provided with a central chamber at one side of and in which the baffle is located, and also having openings in the wall of said chamber and buckets on the outer side of said wall and with which said openings communicate, the buckets being arranged to pass over the inner end of the intake duct and a discharge tube extending from and revolved by the tubular shaft of the rotor and arranged with its outer end eccentric to the rotor, the cover of the casing being provided with a cone, and bearing balls arranged in said cone and engaging the rotor in the angle between the outer side thereof and the inner end of its tubular shaft.

4. A sprayer of the class described including a body having an intake duct discharging at a point out of the center of said body and also having a baffle also arranged at one side of the center of said body, a cover forming a chamber into which the intake duct discharges, and a rotor arranged in said chamber and having a central chamber at one side of and in which the baffle is located and also having openings in the wall of its chamber and buckets on the outer side of said wall and with which said openings communicate, the buckets being arranged to pass over the inner end of the intake duct, said rotor having a discharge tube extending from and revolving therewith and communicating at its inner end with the chamber of the rotor.

In testimony whereof I affix my signature in presence of two witnesses.

THEODORE WANG.

Witnesses:
ROBT. L. JACKSON,
GLENN L. VELBOOM.

Copies of this patent may be obtained for five cents each, by addressing the "Commissioner of Patents, Washington, D. C."